(12) United States Patent
Richardson et al.

(10) Patent No.: US 6,888,832 B2
(45) Date of Patent: May 3, 2005

(54) METHOD AND SYSTEM FOR NOTIFYING CUSTOMER OF VOICEMAIL USING AN ATM SIGNALING CHANNEL FROM AN ATM/DSL HEAD-END NETWORK

(75) Inventors: John William Richardson, Hamilton, NJ (US); Kumar Ramaswamy, Plainsboro, NJ (US)

(73) Assignee: Thomson Licensing S.A., Boulogne-Billancourt (FR)

(*) Notice: Subject to any disclaimer, the term of this patent is extended or adjusted under 35 U.S.C. 154(b) by 58 days.

(21) Appl. No.: 10/044,267

(22) Filed: Jan. 11, 2002

(65) Prior Publication Data

US 2003/0133455 A1 Jul. 17, 2003

(51) Int. Cl.[7] .............................. H04L 12/66; H04J 3/16; H04M 3/42; H04M 11/00
(52) U.S. Cl. ..................... 370/395; 370/352; 370/466; 379/211; 379/243; 455/413
(58) Field of Search .................................. 370/254, 259, 370/352, 395, 401, 466, 494–497, 465, 354–356, 470–474; 379/211–214, 265, 266, 93, 220; 455/413, 456, 466, 560; 709/217, 227, 249, 250

(56) References Cited

U.S. PATENT DOCUMENTS

| | | | | |
|---|---|---|---|---|
| 5,600,643 A | * | 2/1997 | Robrock, II | 370/399 |
| 5,711,011 A | * | 1/1998 | Urs et al. | 455/520 |
| 5,802,466 A | * | 9/1998 | Gallant et al. | 455/413 |
| 5,937,040 A | * | 8/1999 | Wrede et al. | 379/93.23 |
| 6,014,559 A | * | 1/2000 | Amin | 455/413 |
| 6,021,114 A | * | 2/2000 | Shaffer et al. | 370/232 |
| 6,032,039 A | * | 2/2000 | Kaplan | 455/413 |
| 6,075,784 A | * | 6/2000 | Frankel et al. | 370/356 |
| 6,275,494 B1 | * | 8/2001 | Endo et al. | 370/395 |
| 6,301,250 B1 | * | 10/2001 | Schmitz | 370/395.61 |
| 6,351,523 B1 | * | 2/2002 | Detlef | 379/88.14 |
| 6,359,881 B1 | * | 3/2002 | Gerszberg et al. | 370/354 |
| 6,359,892 B1 | * | 3/2002 | Szlam | 370/401 |
| 6,389,276 B1 | * | 5/2002 | Brilla et al. | 455/413 |
| 6,407,997 B1 | * | 6/2002 | DeNap et al. | 370/352 |
| 6,456,700 B1 | * | 9/2002 | Malik | 379/88.19 |
| 6,490,273 B1 | * | 12/2002 | DeNap et al. | 370/352 |
| 6,493,445 B2 | * | 12/2002 | Garland et al. | 379/243 |
| 6,529,500 B1 | * | 3/2003 | Pandharipande | 370/352 |
| 6,584,074 B1 | * | 6/2003 | Vasamsetti et al. | 370/254 |

* cited by examiner

Primary Examiner—Man U. Phan
(74) Attorney, Agent, or Firm—Joseph S. Tripoli; Harvey D. Fried; Joseph J. Kolodka

(57) ABSTRACT

An asynchronous transfer mode (ATM) digital subscriber line (DSL) head end network includes customer premise equipment (CPE), which delivers DSL service to at least one customer. A voicemail server is disposed remotely from the CPE for storing voice messages left for the at least one customer. A service controller for managing system traffic is coupled to the voicemail server such that when a voicemail message is recorded on the voicemail server an ATM signaling channel is employed to notify the customer premise equipment that the voicemail is awaiting to be retrieved. A method for providing voicemail to customers from an asynchronous transfer mode (ATM) digital subscriber line (DSL) head end network is also disclosed.

11 Claims, 2 Drawing Sheets

METHOD AND SYSTEM FOR NOTIFYING CUSTOMER OF VOICEMAIL USING AN ATM SIGNALING CHANNEL FROM AN ATM/DSL HEAD-END NETWORK

FIELD OF THE INVENTION

The present invention generally relates to network communications and, more particularly, to a method and system for notifying customer premise equipment (CPE) devices of a voicemail message in an asynchronous transfer mode (ATM)/asynchronous digital subscriber line (ADSL) environment.

BACKGROUND OF THE INVENTION

Asynchronous transfer mode/asynchronous digital subscriber line (ATM/ADSL) networks include equipment typically maintained at a central office, for example, switching equipment and multiplexing equipment. The ATM/ADSL networks also include equipment maintained at a customer's location, for example, customer premise equipment (CPE) and customer interface devices, such as telephones and computers. Incumbent local exchange carriers (ILECs) may provide additional telephone related services, such as caller identification and voicemail for customers.

In current ATM/ADSL head-end networks, while it is possible to offer voicemail services independent of an incumbent local exchange carrier (ILEC). There is presently no way to alert a customer that a voicemail message has been left. ILECs are able to alert a customer that a voicemail message has been left through the use of shudder dial tone. A phone that may have a voicemail indicator light on it may periodically pickup the phone at certain intervals and detect for a shudder dial tone. If the shudder dial tone exists, then the voicemail indicator will be turned on.

While competitive local exchange carriers (CLECs) can offer voicemail service to their customers, a method for alerting the customers that a voicemail message has been recorded needs to be introduced to make the service effective.

Therefore, a need exists for a locally provided voicemail service controlled by an ATM head-end network which alerts a customer at the customer's location that a voicemail message has been recorded for a given telephone number. A further need exists for an ATM signaling channel, which communicates with customer premise equipment to provide status information for a voicemail messaging service.

SUMMARY OF THE INVENTION

An asynchronous transfer mode (ATM) digital subscriber line (DSL) head end network includes customer premise equipment (CPE), which delivers DSL service to at least one customer. A voicemail server is disposed remotely from the CPE for storing voice messages left for at least one customer. A service controller for managing system traffic is coupled to the voicemail server, such that when a voicemail message is recorded on the voicemail server an ATM signaling channel is employed to notify the customer premise equipment that the voicemail is awaiting to be retrieved.

A method for providing voicemail to customers from an asynchronous transfer mode (ATM) digital subscriber line (DSL) head end network includes receiving a voicemail message in a voice mail box and signaling a service controller to notify the service controller that a voicemail message has been received. An indicator signal is sent from the service controller over an ATM signaling channel to a customer premise equipment (CPE) device to notify the CPE device that the voicemail message is waiting to be retrieved.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and system, which enables voicemail services to be provided from an asynchronous transfer mode (ATM) head end network. A voicemail server is centrally located at, for example, a central office, and intercepts calls and stores messages for the voicemail service. A control processor for the network employs an ATM channel to signal customer premise equipment to provide an indicator to alert the customer at their location that a message has been received and is waiting to be retrieved from the voicemail server. In one embodiment, an ATM signaling channel is coupled to customer premise equipment (CPE) to provide the indicator to alert the customer that a message is ready to be retrieved from the voicemail server. Through the use of an ATM signaling channel, notification to, for example, a digital subscriber line (DSL) customer of awaiting voicemail is enabled.

The present invention provides a mechanism for notifying a customer that a voicemail message has been received. Voicemail is provided by having a voicemail server located within the DSL network infrastructure and not on the telephone company switch. If the voicemail server is not located at the telephone switch and is located in the DSL network infrastructure, a different mechanism is needed to notify the end-customer that a voicemail is waiting. In one embodiment of the present invention, an ATM virtual circuit-signaling channel is employed to notify the customer that a voicemail is waiting for them.

It should be understood that the elements shown in the FIGS. may be implemented in various forms of hardware, software or combinations thereof. Preferably, these elements are implemented in hardware on one or more appropriately programmed general-purpose devices, which may include a processor, memory and input/output interfaces. The elements shown in the FIGS. may also be implemented in software on one or more of the appropriately programmed general-purpose devices.

Figure 1:
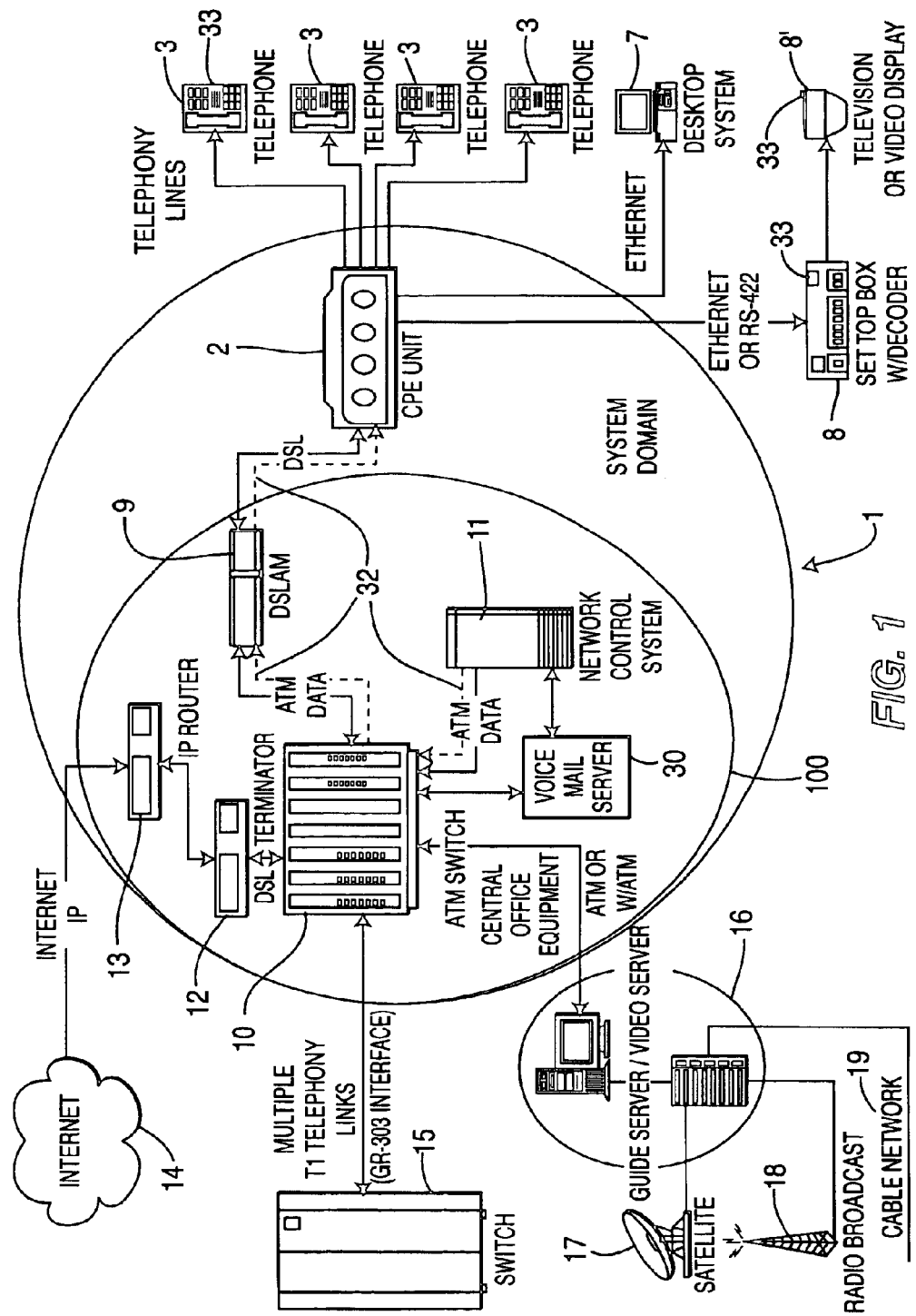
FIG. 1 is an exemplary head end network architecture showing components employed in accordance with the present invention.

Referring now in specific detail to the drawings in which like reference numerals identify similar or identical elements throughout the several views, and initially to FIG. 1, a schematic block diagram of a digital subscriber line (DSL) head end network 1 is illustratively shown. System architecture 1 is presented as an exemplary DSL environment for employing the inventive method and system in accordance with the present invention. The system block diagram 1 is comprised of several functional blocks. The system domain is composed of Central Office (CO) Equipment 100 and Customer Premise Equipment (CPE) 2. FIG. 1 is schematically shown and may include other equipment known to those skilled in the art. The component blocks within the system domain and their respective interfaces include: customer premise equipment (CPE) 2, Digital Subscriber Line Access Multiplexer (DSLAM) 9, an ATM switch 10, a public switched telephone network (PSTN) switch 15 and a network or service control system 11.

One illustrative set-up for customer premise equipment (CPE) 2 includes, for example, a DSL modem unit that interfaces with user devices, such as for example, analog telephones 3 employing, e.g., plain old telephone service (POTS), a 10Base-T Ethernet connection to a PC desktop system 7, and/or an Ethernet or RS-422 connection to a set-top box with a decoder 8 for connection to, for example, a television or video display 8'. From the customer's analog end, the CPE device 2 accepts the analog input from each of the telephones or devices and converts the analog input to digital data, and packages the data into ATM packets (POTS over ATM), with each connection having a unique virtual channel identifier/virtual path identifier (VCI/VPI).

An ATM is a connection-oriented protocol and as such there is a connection identifier in every cell header, which explicitly associates a cell with a given virtual channel on a physical link. The connection identifier includes two subfields, the virtual channel identifier (VCI) and the virtual path identifier (VPI). Together these identifiers are used for multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem to be modulated and delivered to the DSLAM unit 9.

The DSL signal is received and demodulated by the DSL modem in the customer premise equipment 2 and delivered to VPI/VCI detection processing. The ATM cell data with VPI/VCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

DSLAM 9 demodulates data from multiple DSL modems and concentrates the data onto the ATM backbone network for connection to the rest of the network. That DSLAM provides back-haul services for package, cell, and/or circuit based applications through concentration of the DSL lines onto ATM outputs to the ATM switch 10. The ATM switch 10 is the backbone of the ATM network. The ATM switch 10 performs various functions in the network, including cell transport, multiplexing and concentration, traffic control and ATM-layer management. Of particular interest in the system domain 100, the ATM switch 10 provides for the cell routing and buffering in connection to the DSLAM 9, network control system 11 and the Internet gateway connections, and T1 circuit emulation support in connection with the multiple telephony links switch 15.

The ATM switch 10 may also be coupled to a program guide server/video server 16 to satellite 17, radio broadcast 18 or cable 19 networks. The ATM switch 10 may also be coupled over a DSL terminator 12 and Internet protocol (IP) router 13 pair to receive Internet Protocol IP packet data from the Internet 14.

The network control system 11 provides for address translation, demand assignment and call management functions. The network control system's principle function is to manage the DSL/ATM network including the origination and termination of phone calls, e.g., provisioning and routing calls. The NCS is essentially the control entity communicating and translating control information between a class 5 PSTN switch 15 (using e.g., the SS7 or GR-303 protocols) and the CPE 2. The network control system 11 is available for other functions such as downloading code to the CPE, and bandwidth and call management (e.g., busy) functions, as well as other service provisioning and set up tasks.

NCS 11 receives information on the destination phone number from the CO Control Protocols (e.g., SS7 or GR303). In accordance with the present invention, a method and system for notifying a customer of awaiting voicemail is provided to support voicemail services. A voicemail server 30 is provided, preferably within the central office 100, although voicemail server 30 may be disposed anywhere within the network. Voicemail server 30 is coupled to either of ATM switch 10 or to network control system 11 or both. Voicemail server 30 responds to unanswered calls at the customer's location by playing an announcement and storing a voice message left by the caller. Once voicemail server 30 saves a message, a signal is sent to network control server 11 to indicate the status for a particular voice mailbox. The voice mailbox is associated with a telephone number and server 11 will be prompted to notify the customer of the status.

Server 11 communicates with the voicemail server to determine if a voicemail message has been left. In the event a voicemail message was left, server 11 will signal to the appropriate CPE 2 indicating awaiting voicemail. In A one embodiment, the notification of the customer is provided by using an ATM signaling channel 32 (illustratively indicated in FIG. 1 by line 32) from server 11 to customer premise equipment (CPE) 2.

A packet of data is sent over ATM signaling channel 32. The information signaled by ATM signaling channel 32 to CPE 2 can be as simple as a flag indicating a message is waiting or may include more detailed information. The more detailed information may include items such as time of day, phone number of the person who left the message, who the voicemail is for, etc. The message indicator signal is routed through ATM switch 10 and DSLAM 9 to the appropriate CPE 2. A voicemail box or storage location on voicemail server 30 is associated with the telephone number of the customer to receive the retrieved voicemail message. Customer access equipment, for example, telephones 3 or PC 7 are coupled to CPE 2, and preferably include an indicator 33 such as an icon or a blinking light, which is responsive to CPE notification that the voicemail is awaiting to be retrieved. Indicator 33 alerts the customer at their location that the voicemail box has messages waiting.

In one embodiment, the signaling channel is set up as a permanent virtual circuit (PVC). A unique signaling channel may be setup from NCS 11 to each CPE 2. If voicemail server 30 is not integrated into NCS package, then a subsequent signaling channel may be setup between NCS 11 and voicemail server 30 (this signaling channel may be a common virtual circuit).

Several message types can be conveyed from NCS 11 to the CPE 2 by using a unique message identifier. For example, message types may include ratings such as urgent, important, not important or be based on location of where the incoming call was placed from (e.g., long distance, local, from a particular individual, etc.). The rating or other indicia may be added to the unique identifier by the caller leaving the message. The voicemail awaiting indication message may include the unique identifier indicating that a voicemail message is waiting for the customer. This message is sent to CPE 2 when a voicemail has been left, or when CPE 2 is powered up. Additional information can be conveyed along with the message type, such as a telephone number, time of day, etc. that can correspond to the voicemail message.

In other embodiments, an alert signal may be sent to a set top box 8 (which may include a flashing light 33 or other alerting mechanism) or be displayed on display 8', which may include a television screen. Alternately, display 8' may include a flashing light 33, etc. for voicemail notification.

Figure 2:
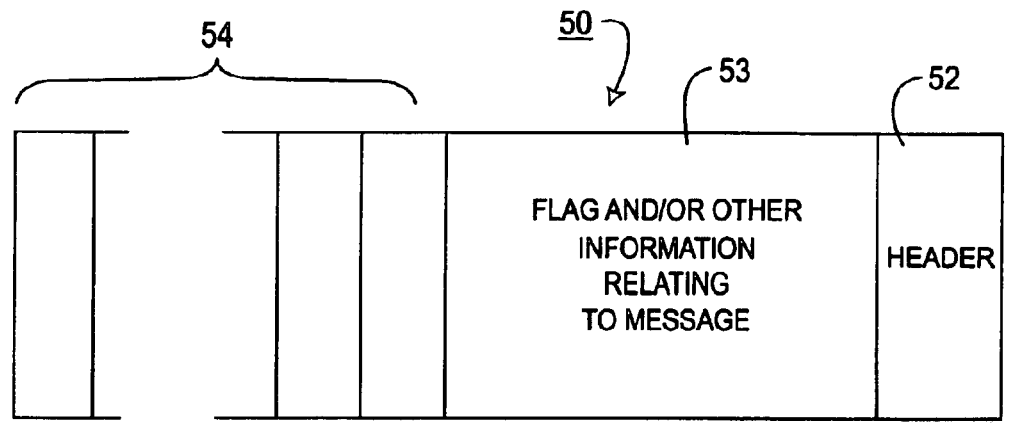
FIG. 2 is a schematic diagram showing an ATM cell employed to indicate a message has been recorded in accordance with the present invention.

Referring to FIG. 2, a schematic diagram showing an illustrative ATM cell 50 is shown in accordance with the present invention. ATM cell 50 includes a header 52, which carries routing information including the destination (e.g., telephone number or account) to which a voicemail message pending signal is to be sent. A field or fields 53 within cell or cells 50 may be employed to carry data or other information related to the voicemail. In one example, field 53 transports a flag (e.g., a single bit) to indicate the presence of a voice message on server 30. Field or fields 53 may include other information as well, for example, time of day, phone number of the person who left the message, who the voicemail is for, etc. The rating or other indicia may be included as well as described above. Preferably this information is related to the voicemail message. Other information including voice, data or video may be provided in remaining fields 54 of cell 50. ATM signaling channel 32 may include one of a plurality of virtual channels maintained between server 11 and CPE 2 (FIG. 1). ATM signaling channel 32 is preferably routed through DSLAM 9 to CPE 2 The ATM signaling channel is preferably a permanent virtual circuit, which is setup when a customer gets provisioned. This type of virtual circuit is common for all types of signaling between NCS 11 and CPE 2.

Figure 3:
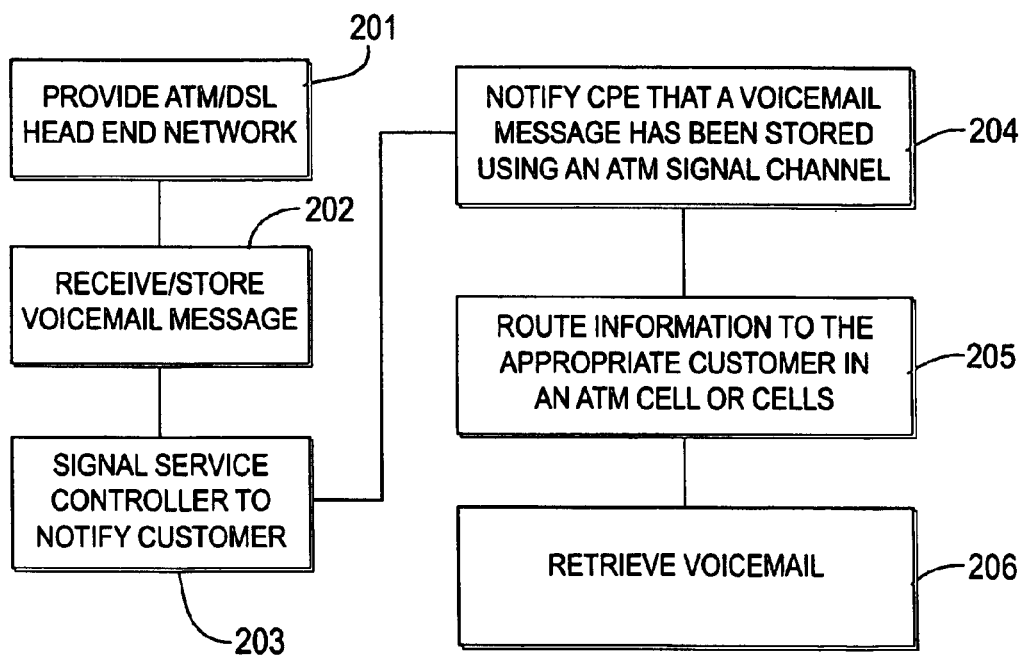
FIG. 3 is a flow/block diagram showing an illustrative method for retrieving voicemail messages in accordance with the present invention.

Referring to FIG. 3, a block/flow diagram showing a method for providing voicemail to customers from an asynchronous transfer mode (ATM) digital subscriber line (DSL) head end network is shown in accordance with the present invention. In block 201, a DSL head end network is provided which includes a voicemail server, a service controller (network control system), and ATM network components including a DSLAM and an ATM switch. Customer premise equipment (CPE) devices are also provided. In block 202, a voicemail message is recorded and stored at the voicemail server or voice mailbox. Messages may be left if the telephone or personal computer (PC) is not answered responsive to an incoming call.

In block 203, a service controller is signaled by the voicemail server to notify the service controller that a voicemail message has been received. Responsive to this, an indicator signal is sent from the service controller preferably over an ATM signaling channel to a customer premise equipment (CPE) device to notify the CPE device that the voicemail message is waiting to be retrieved in block 204. In block 205, the ATM signaling channel routes the information, such as a flag indicating a message has been taken or information relating to the voicemail message, in an ATM cell or cells to an appropriate customer, based on a telephone number associated with the voice mail box.

In block 206, the voicemail message may be retrieved by the customer from the customer access equipment (e.g., telephone or PC). The customer access equipment is coupled to the CPE. When the CPE is notified, an indicator on the customer access equipment, such as, an icon or a light may be activated to alert the customer that a message awaits.

Having described preferred embodiments for method and system for notifying customer of voicemail using an ATM signaling channel from an ATM/DSL head-end network (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An asynchronous transfer mode (ATM) digital subscriber line (DSL) head end network, comprising:
    customer premise equipment (CPE), which delivers DSL service to at least one customer;
    a voicemail server disposed remotely from the CPE for storing voice messages left for the at least one customer; and
    a service controller for managing system traffic coupled to the voicemail server such that when a voicemail message is recorded on the voicemail server an ATM signaling channel is employed to notify the customer premise equipment that the voicemail is awaiting to be retrieved, the ATM signaling channel transfers an ATM cell, which includes a flag for indicating that the voicemail message waits for retrieval.

2. The head end network as recited in claim 1, wherein the at least one customer includes a plurality of customers and the CPE includes a plurality of CPEs, and the head end network further comprises an ATM switch for routing the ATM signaling channel to an appropriate customer based on a telephone number associated with a voice mail box.

3. The head end network as recited in claim 2, further comprising a multiplexer for addressing the ATM signaling channel to the appropriate customer.

4. The head end network as recited in claim 1, wherein the ATM signaling channel transfers an ATM cell, which includes information relating to the voicemail message.

5. The head end network as recited in claim 1, wherein the service controller is located at a central station.

6. The head end network as recited in claim 1, further comprising customer access equipment coupled to the CPE, the customer access equipment having an indicator which is responsive to CPE notification that the voicemail is awaiting to be retrieved.

7. The head end network as recited in claim 6, wherein the customer access equipment includes one of a telephone, a set top box and a display.

8. A method for providing voicemail to customers from an asynchronous transfer mode (ATM) digital subscriber line (DSL) head end network, comprising the steps of:
    receiving a voicemail message in a voice mailbox;
    signaling a service controller to notify the service controller that a voicemail message has been received;
    sending an indicator signal from the service controller over an ATM signaling channel to a customer premise equipment (CPE) device to notify the CPE device that the voicemail message is waiting to be retrieved; and
    transferring an ATM cell on the ATM signaling channel, which includes information relating to the voicemail message.

9. The method as recited in claim 8, further comprising the step of routing the ATM signaling channel to an appropriate customer based on a telephone number associated with a voice mail box.

10. The method as recited in claim 8, further comprising the step of transferring an ATM cell on the ATM signaling channel, which includes information relating to the voicemail message.

11. The method as recited in claim 8, further comprising the step of indicating that the voicemail is waiting to be retrieved on customer access equipment coupled to the CPE.

* * * * *